Feb. 21, 1933. N. KOPP 1,898,251
MOLD FOR MAKING PRESSED GLASS ARTICLES
Filed Jan. 3, 1929
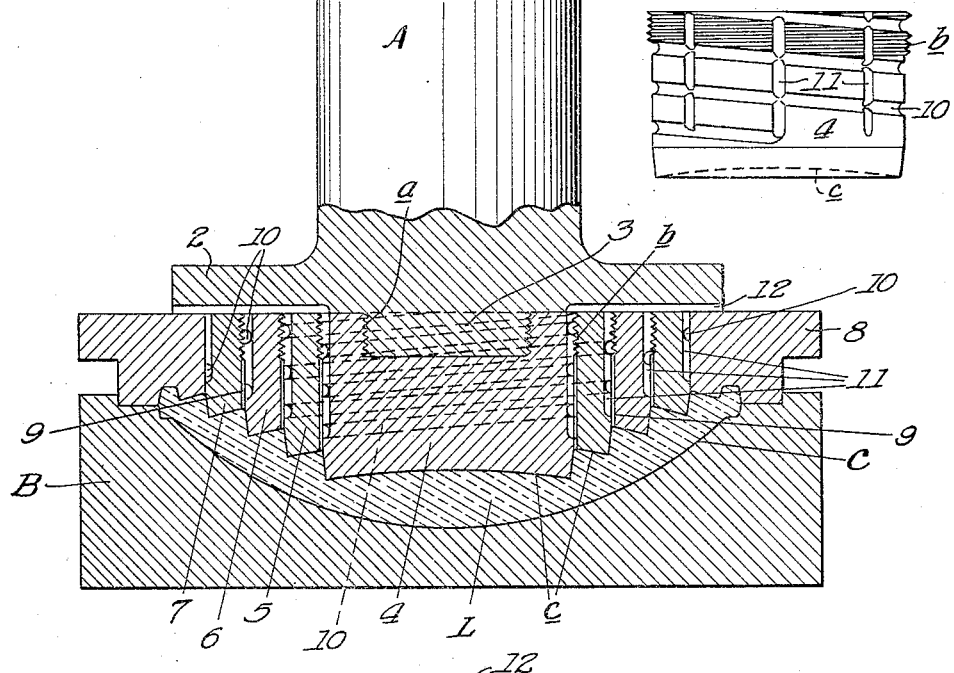

Patented Feb. 21, 1933

1,898,251

UNITED STATES PATENT OFFICE

NICHOLAS KOPP, OF PITTSBURGH, PENNSYLVANIA

MOLD FOR MAKING PRESSED GLASS ARTICLES

Application filed January 3, 1929. Serial No. 330,064.

My invention relates to improvements in molds for making pressed glass articles, and more particularly to a mold for making dished or recessed lenses designed to be employed in signal systems, although it will be evident that the present invention is not to be limited in its scope to the making of glass articles of the character specified.

As heretofore followed in making lenses of the character specified, it is the practice to form these lenses directly in molds without the necessity of grinding and polishing the lenses. Considerable trouble, however, has been met with under this method of manufacture, due mainly to the insufficient means provided for the escape of air from the compression space of the mold and the introduction of air thereto when required, resulting in forming pin head protuberances and wavy surfaces in the lenses, thereby distorting the lenses to such an extent as to misdirect the light rays from their true course as contemplated under optical laws.

It is the prime object of the present invention to provide a mold of the character stated embodying means to effect a discharge of air from the mold during the molding operation, as well as to supply air thereto after the pressing operation has been accomplished.

Additional objects and advantages will become apparent from a reference to the specification taken in connection with the accompanying drawing, wherein:

Fig. 1 is a part elevational and a part vertical sectional view of a mold structure embodying my invention;

Fig. 2, a bottom plan view of the upper mold member; and

Fig. 3, an elevational view of one of the mold elements, particularly showing the air grooves or channels.

Referring to the drawing, A designates the upper mold member or plunger head suitably secured to a vertically operable plunger P, and adapted to cooperate with a lower mold member B. Said upper mold member A is formed with a laterally extending annular flange 2 and with a depending threaded portion 3. Fixedly secured thereto, I provide the forming part of the mold composed of a plurality of mold units or members secured together and comprising the desired configuration of the article to be formed. It will be understood that these members may be of any desired shape or form so as to form the configuration desired.

As shown and as preferred, the upper mold member is made up of a plurality of forming units or members including a central depending member 4 and three concentrically arranged ring members 5, 6 and 7, of varying depths and diameters, all secured together in stepped relationship to form the configuration of a lens L. Member 4 is internally threaded, as at $a$, to engage the threaded portion 3, and is formed with upset external threads $b$, to cooperate with the internal threads of the ring member 5. The ring members 5, 6 and 7 are similarly constructed to provide, when assembled, a compact unit, as shown in Fig. 1.

The outermost ring 7 cooperates with a removable centering and guiding ring 8 positioned on the bottom mold member B. The lower edges of said ring members have arcuate surfaces, as at $c$, to form the desired curvatures in the lens L.

The external surfaces of member 4 and ring members 5, 6 and 7 are ground to provide intervening air spaces 9 therebetween. Air spaces 9 are preferably less than 1/64 of an inch in width, but have been enlarged in the drawing, for the purpose of illustration. The external surfaces of said members are further provided with spiral grooves 10, and a plurality of vertical grooves or ducts 11, designed to register with cooperating radial grooves 12 formed in the under surface of flange 2.

In operation, the upper mold member is lowered into the lower mold member in the usual manner. This act of lowering the upper mold member on the forming part thereof into the lower mold member tends to trap the air contained in the cavity C of said lower mold member and as the mold descends, this air is compressed somewhat and afterwards escapes to the atmosphere by means of the spaces 9, grooves 10 and 11, and the grooves or channels 12 of the flange 2, thus practically freeing the interior of the mold of any air and thus enabling a perfect lens to be molded.

During the operation of raising the upper mold relatively to the lower member, or at other times, it will be understood that the said air spaces and the said passages for air will function to admit air to the interior of the mold, thereby destroying any vacuum that is frequently formed between the movable mold member and the glass.

I claim:

1. In a mold of the character specified, a mold member including a plurality of concentrically assembled mold units of varying depths, threaded means formed for securing said units together, each of said units having air passages therein, said units additionally formed to provide a space between the units when assembled.

2. In a mold of the character specified, a mold member comprising a head having radially extending air passages and including a plurality of concentrically assembled mold units, means for securing the said units together, each of said units having air passages therein communicating with passages of the head.

3. In a mold of the character specified, a mold member comprising a head having radially extending air passages and including a plurality of concentrically assembled mold units, means for securing the said units together, each of said units having air passages therein communicating with passages of the head, said units additionally formed to provide a space between the respective units when assembled.

4. In a mold of the character specified, a mold member comprising a head having radially extending air passages and including a plurality of concentrically assembled mold units, cooperating means on the units for securing the said units together, each of said units formed with spiral and vertically extending grooves on the exterior thereof to provide air passages, said grooves in communication with the air passages of the head.

In testimony whereof I affix my signature.

NICHOLAS KOPP.